United States Patent
Kudo

(10) Patent No.: US 9,591,204 B2
(45) Date of Patent: Mar. 7, 2017

(54) FOCUS DETECTING UNIT, FOCUS DETECTING METHOD, IMAGE PICKUP APPARATUS, AND IMAGE PICKUP SYSTEM

(71) Applicant: CANON KABUSHIKI KAISHA, Tokyo (JP)

(72) Inventor: Hiroshi Kudo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/672,486

(22) Filed: Mar. 30, 2015

(65) Prior Publication Data

US 2015/0296127 A1 Oct. 15, 2015

(30) Foreign Application Priority Data

Apr. 9, 2014 (JP) ................................ 2014-079833

(51) Int. Cl.
| | |
|---|---|
| H04N 5/232 | (2006.01) |
| G06T 5/00 | (2006.01) |
| H04N 5/357 | (2011.01) |
| H04N 5/369 | (2011.01) |
| H04N 5/217 | (2011.01) |
| H04N 9/097 | (2006.01) |

(52) U.S. Cl.
CPC ......... H04N 5/23212 (2013.01); G06T 5/008 (2013.01); H04N 5/217 (2013.01); H04N 5/3572 (2013.01); H04N 5/3696 (2013.01); H04N 9/097 (2013.01)

(58) Field of Classification Search
CPC . H04N 5/3572; H04N 5/23212; H04N 5/2254
See application file for complete search history.

(56) References Cited

U.S. PATENT DOCUMENTS

2003/0035652 A1* 2/2003 Kubo ..................... H04N 5/243
396/213
2004/0179128 A1* 9/2004 Oikawa .............. H04N 5/23212
348/345

FOREIGN PATENT DOCUMENTS

JP 2013-140380 A 7/2013

* cited by examiner

*Primary Examiner* — Ahmed A Berhan
(74) *Attorney, Agent, or Firm* — Fitzpatrick, Cella, Harper & Scinto

(57) ABSTRACT

A focus detecting unit that includes a corrector configured to correct a signal output from an image sensor using a first shading correction value when the half-mirror is retreated from an optical path, and to correct the signal using a second shading correction value different from the first shading correction value when the half-mirror is inserted into the optical path, and a focus detector configured to provide a focus detection based on the signal corrected by the corrector.

12 Claims, 7 Drawing Sheets

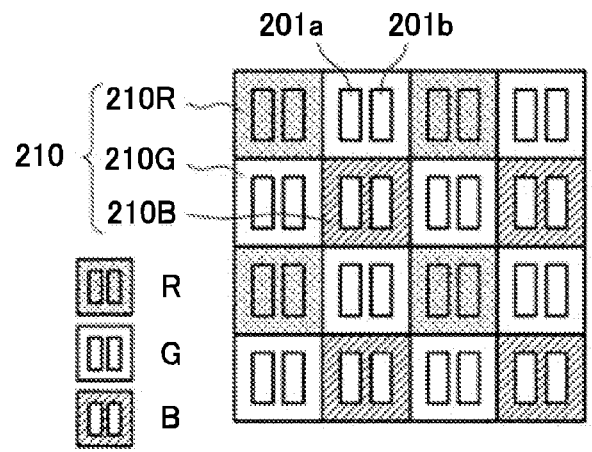
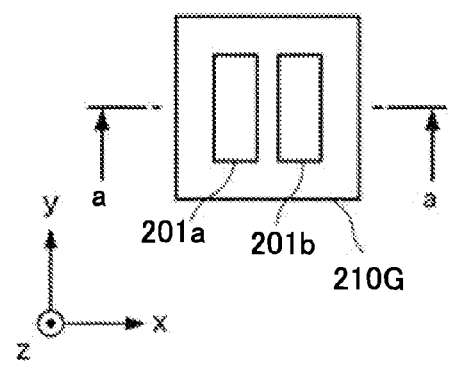
FIG. 2A    FIG. 2B
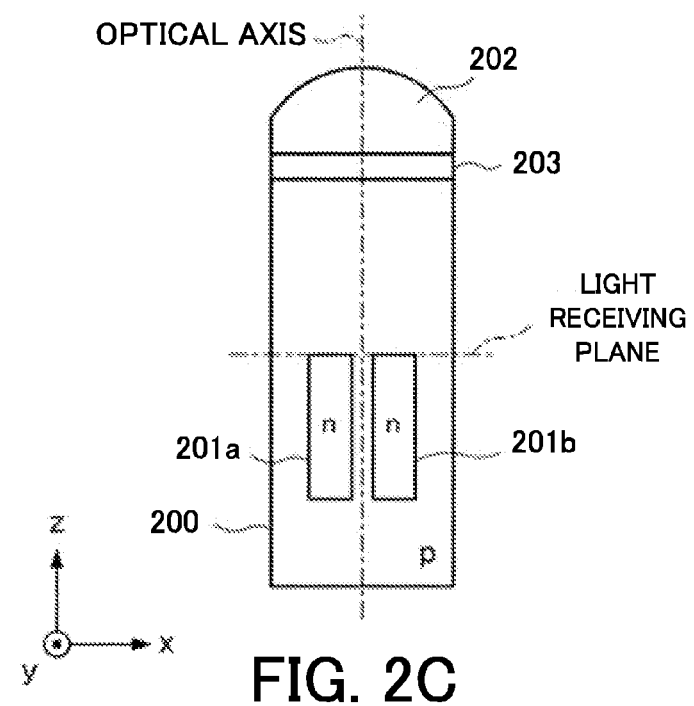
FIG. 2C

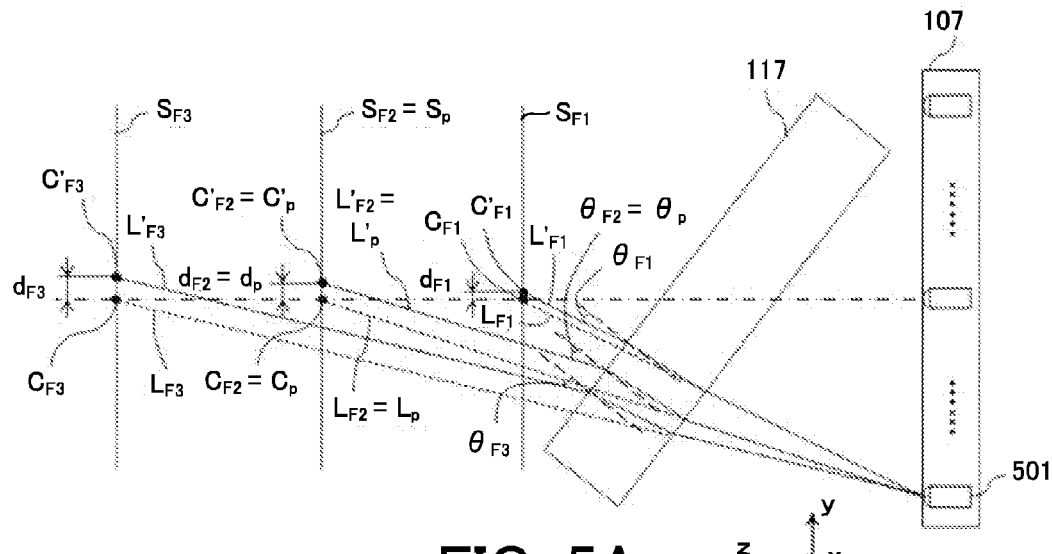
FIG. 5A
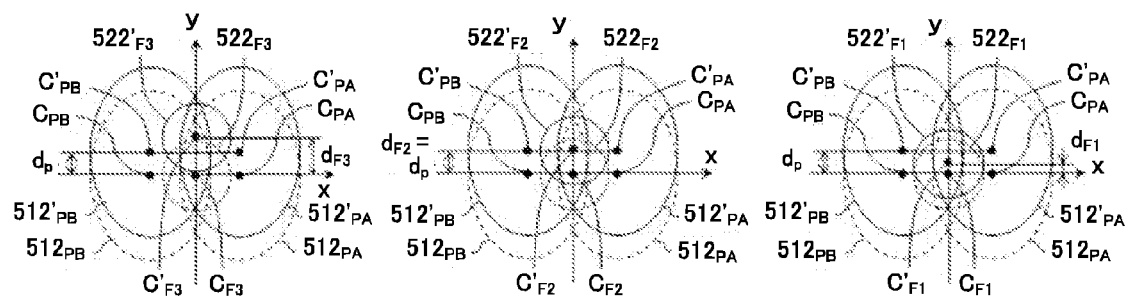
FIG. 5B  FIG. 5C  FIG. 5D
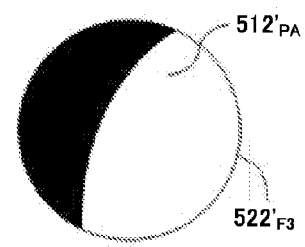 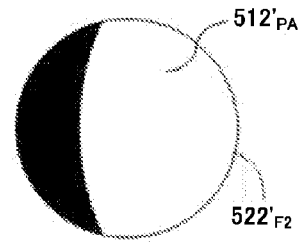 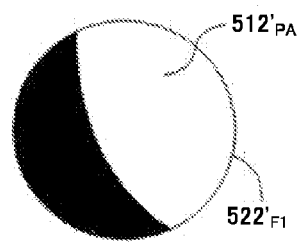
FIG. 5E  FIG. 5F  FIG. 5G // FOCUS DETECTING UNIT, FOCUS DETECTING METHOD, IMAGE PICKUP APPARATUS, AND IMAGE PICKUP SYSTEM

BACKGROUND OF THE INVENTION

Field of the Invention

The present invention relates to a focus detecting unit configured to provide a focus detection based on a signal from an image sensor.

Description of the Related Art

Japanese Patent Laid-Open No. ("JP") 2013-140380 discloses an image pickup apparatus having an image sensor that serves as a focus detecting element. The image pickup apparatus disclosed in JP 2013-140380 discloses a method of storing, when the half-mirror is inserted into the optical path, an image-plane moving amount caused by the insertion of the half-mirror, as an offset amount of a defocus amount by considering the F-number in the image pickup lens, and of correcting the defocus amount.

However, the image pickup apparatus disclosed in JP 2013-140380 does not consider a positional shift of a pupil corresponding to each focus detecting pixel caused by the insertion of the half-mirror, or in turn a change of shading.

SUMMARY OF THE INVENTION

The present invention provides a focus detecting unit that is advantageous to a focus detection.

A focus detecting unit according to the present invention includes a corrector configured to correct a signal output from an image sensor using a first shading correction value when the half-mirror is retreated from an optical path, and to correct the signal using a second shading correction value different from the first shading correction value when the half-mirror is inserted into the optical path, and a focus detector configured to provide a focus detection based on the signal corrected by the corrector.

Further features of the present invention will become apparent from the following description of exemplary embodiments with reference to the attached drawings.

BRIEF DESCRIPTION OF THE DRAWINGS

FIGS. 2A-2C are views for explaining a structure of an image pickup pixel.

FIGS. 5A to 5G are schematic views illustrating a shift between a pupil and frame corresponding to a peripheral pixel due to the insertion of the half-mirror. More specifically, FIG. 5A is a sectional view of a y-z plane illustrating an optical path when the half-mirror is inserted. FIGS. 5B to 5D are views illustrating a positional relationship between the pupil and the frame. FIGS. 5E to 5G are enlarged views of a pupil in the frame.

FIG. 6A is the sectional view of the y-z plane of the optical path when the half-mirror is inserted. FIGS. 6B and 6C are views illustrating the positional relationship between the pupil and frame. FIGS. 6D and 6E are enlarged views of the pupil in the frame.

FIG. 7A is the sectional view of the y-z plane illustrating the optical path when the half-mirror is inserted. FIG. 7B is a general view of the pupil and the frame. FIG. 7C is an enlarged view of a pupil for an A image in the frame. FIG. 7D is an enlarged view of a pupil for a B image in the frame.

DESCRIPTION OF THE EMBODIMENTS

Referring now to the accompanying drawings, a description will now be given of embodiments according to the present invention.

Figure 1:
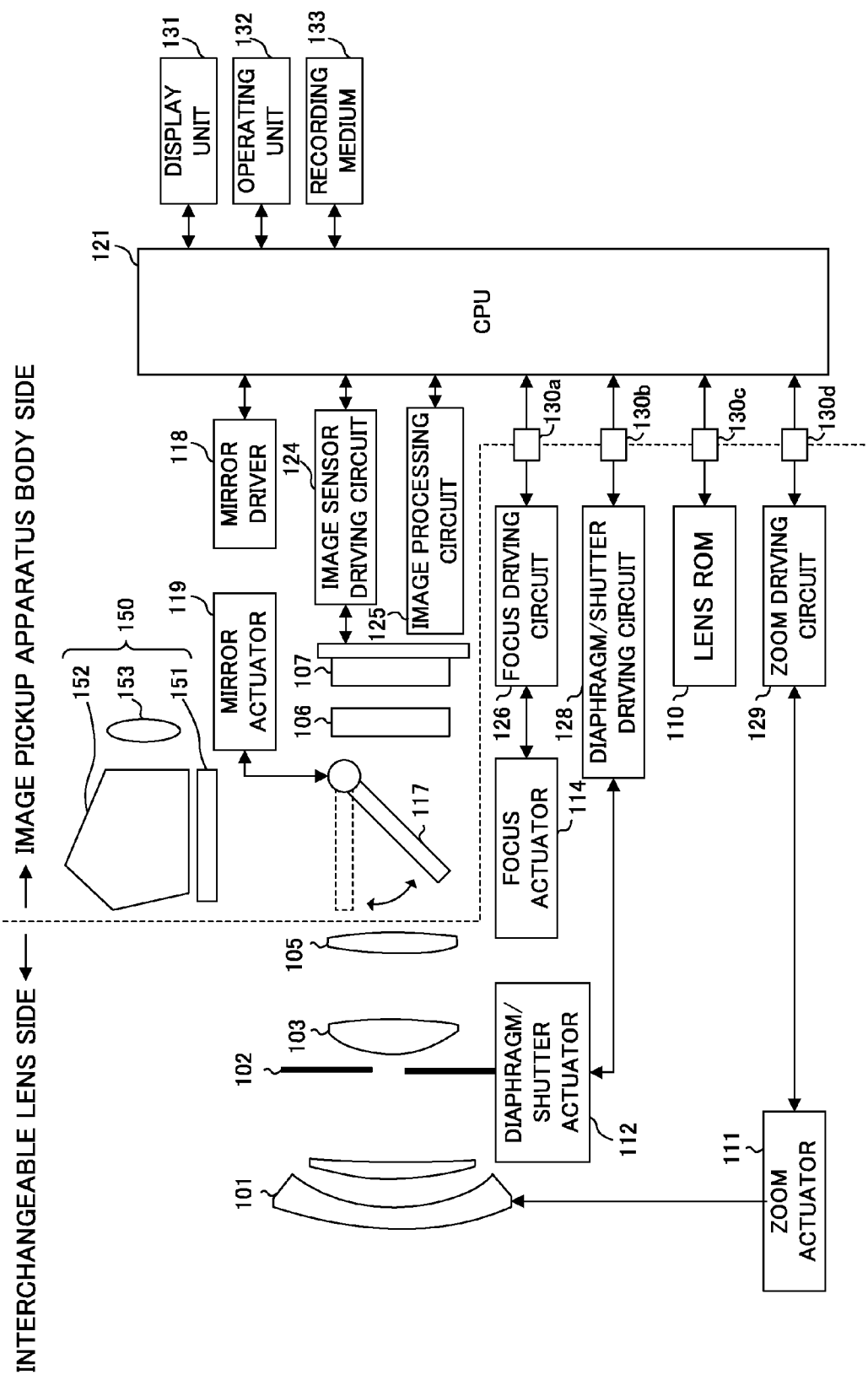
FIG. 1 is a view of a structural example of an image pickup apparatus according to an embodiment of the present invention.

FIG. 1 is a structural example of an image pickup apparatus according to this embodiment. While FIG. 1 illustrates a lens interchangeable type image pickup apparatus (image pickup system), the image pickup apparatus according to the present invention is not limited to this embodiment and may be a lens integrated type image pickup apparatus. In the arrangement of each component, an object side is defined as a front side of the image pickup apparatus, and an image side is defined as its rear side.

FIG. 1 illustrates the image pickup apparatus (body), and the image pickup lens (image pickup optical system) attachable to and detachable from the image pickup apparatus (body), and the image pickup lens is attached to the image pickup apparatus. A first lens unit 101 is located at the front end (on the object side) among lens units in the image pickup lens (image pickup optical system), and held movably in the optical axis direction in an unillustrated lens barrel. A diaphragm/shutter (in which the diaphragm serves as the shutter) 102 adjusts an aperture diameter and consequently a light quantity at the image pickup time and serves as an exposure adjusting shutter at a still image pickup time. A second lens unit 103 moves back and forth in the optical axis direction together with the diaphragm/shutter 102 for zooming in association with the back and forth movement of the first lens unit 101.

A third lens unit 105 is a focus lens unit configured to move in the optical axis direction for focusing. An optical low-pass filter 106 is an optical element configured to lessen a false color and moiré in a captured image.

An image sensor 107 includes, for example, a CMOS sensor and its peripheral circuit. The image sensor 107 uses a two-dimensional single-plate color sensor, in which m (lateral direction)×n (longitudinal direction) primary color mosaic filters are Bayer-arranged on the light receiving pixels on the same chip. As described later, the image sensor 107 includes a plurality of pixels each serves as an image pickup pixel and a focus detecting pixel. Hence, the image sensor 107 serves to detect a focusing state.

A lens ROM (read only memory) 110 stores intrinsic data for each interchangeable lens attachable to and detachable from the image pickup apparatus body, and provides necessary lens information for the focus detection etc. to a CPU (central processing unit) 121, which will be described later, through communications. Information of an exit pupil distance is stored in the lens ROM 110 as part of the lens information.

A zoom actuator 111 provides zooming by moving the first lens unit 101 and the second lens unit 103 in the optical axis direction as an unillustrated cam barrel is rotated. A diaphragm/shutter actuator 112 regulates the aperture diameter of the diaphragm/shutter 102 to adjust the image pickup light quantity, and controls the exposure time in the still image pickup. A focus actuator 114 moves the third lens unit 105 in the optical axis direction for focusing.

A half-mirror 117 can be inserted into and retreated from the optical path, and rotated by a mirror actuator 119 controlled by a mirror driving circuit 118, and its state to the optical path changes. A state in which the half-mirror 117 is inserted into the optical path will be referred to as an insertion state, as illustrated by a solid line in FIG. 1. A state in which the half-mirror 117 is retreated from the optical path will be referred to as a retreat state, as illustrated by a broken line in FIG. 1. The half-mirror 117 in the insertion state reflects part of light that has passed the image pickup lens towards a (view)finder optical system 150, and transmits the remaining light that has passed the image pickup lens towards the image sensor 107 through an optical low-pass filter 106.

The finder optical system 150 enables a user to optically observe the object to be captured. The light reflected on the half-mirror 117 is scattered by a focus plate 151 and is converted into an erect image by a penta-dach prism 152. The erect image is enlarged by an eyepiece 153, and observed by the user.

A display unit 131 may use an LCD (liquid crystal display) etc., and displays information on the image pickup mode, a preview image before it is captured, a captured image for confirmation, an image indicative of the in-focus state etc. in the focus detection.

The user can select the following three image pickup mode in the image pickup apparatus according to this embodiment.

The first image pickup mode is a mode used to observe the object as an image to be captured so as to capture a high-quality image. According to the first image pickup mode, the half-mirror 117 is retreated both at the observation time and at the image pickup time. The processed image is displayed on the display unit 131, and the user can observe the processed object image. Since the half-mirror 117 is retreated in the image pickup, this mode can present an image in which the poor quality caused the chromatic aberration, etc. by light that passes the half-mirror 117 is restrained.

The second image pickup mode is a mode used to capture a high-quality image of a moving object. According to the second image pickup mode, the half-mirror 117 is inserted in the observation, and retreated in the image pickup. The user observes the object with the finder optical system 150, and can observe the object image without any delays caused by the image processing etc., suitably for an observation of the moving object. Due to the same reason for the first image pickup mode, this mode can present an image in which the poor quality caused by light that passes the half-mirror 117 is restrained.

The third image pickup mode is a mode used for motion image pickup. According to the third image pickup mode, the half-mirror 117 is inserted both in the observation and in the image pickup. The user can capture the motion image by observing the object image with the finder optical system 150 without any delays caused by the image processing etc.

In any one of image pickup modes, the light from the object enters the image sensor 107 having the focus detecting function in the observation, and thus the focusing state can be detected in the observation. Since the half-mirror 117 can be retreated or inserted in the focus detection according to the image pickup mode selected by the user, the image sensor 107 can receive light that has transmitted through the half-mirror 117 and light that has not transmitted through the half-mirror 117.

The CPU (controller) 121 that governs a variety of controls in the image pickup apparatus body includes a calculator, a ROM, a RAM (random access memory), an A/D converter, and a D/A converter, a communication interface circuit, etc., although they are not illustrated. The CPU 121 drives each component by reading and executing a predetermined program stored in the ROM, and controls such operations as the focus detection, the image pickup, the image processing, recording, etc. The CPU 121 serves as a shading corrector configured to correct shading in the signal (image data) output from the image sensor 107. The shading corrector according to this embodiment uses different shading correction values for the signal output from the image sensor 107 according to the state of the half-mirror 117. A detailed description of the shading correction will be given later. The CPU 121 also serves as a focus detector configured to provide a focus detection based on the in which shading has been corrected. The shading corrector serves as a correction value calculator (shading correction value determiner), which will be described later. The shading corrector and the focus detector constitute a focus detecting unit.

An image sensor driving circuit 124 controls an image pickup operation of the image sensor 107, and sends the obtained image signal to the CPU 121 after the image sensor driving circuit 124 performs the A/D conversion for the obtained image signal. The image processing circuit 125 performs various processing, such as a γ (gamma) conversion, a color interpolation, and a JPEG compression, for the image data obtained from the image sensor 107. The JPEG stands for Joint Photographic Experts Group.

A focus driving circuit 126 and a focus actuator 114 constitute a focusing unit. The focus driving circuit 126 drives the focus actuator 114 based on the focus detection result, and adjusts a defocus amount by moving the third lens unit 105 in the optical axis direction. A diaphragm/shutter driving circuit 128 drives the diaphragm/shutter actuator 112, and controls the aperture diameter of the diaphragm/shutter 102. A zoom driving circuit 129 drives a zoom actuator 111 according to the zooming operation by the photographer. The focus driving circuit 126, the diaphragm/shutter driving circuit 128, the lens ROM 110, and the zoom driving circuit 129 are connected to the CPU (controller) 121 in the image pickup apparatus via communication units 130a to 130d.

An operation unit 132 includes a power switch, a release (image pickup trigger) switch, a zooming switch, an image pickup mode selecting switch, etc. The recording medium 133 may be a flash memory attachable to and detachable from the image pickup apparatus, and stores captured image data.

Next follows a description of a structure of the image sensor 107.

FIG. 2A is a schematic view for explaining a pixel arrangement on the image sensor, and illustrates the pixel arrangement on the two-dimensional CMOS sensor in a range of four rows×four columns. Two rows×two columns of pixels 210 are Bayer-arranged. Pixels 210G having a spectral sensitivity to G (green) are allotted to two diagonal pixels. A pixel 210R having a spectral sensitivity to R (red) and a pixel 210B having a spectral sensitivity to B (blue) are allotted to the other two diagonal pixels. Each of the pixels 210R, 210G, and 210B has two pupil-dividing subpixels (a pair of focus detecting pixels) 201a and 201b. The subpixel 201a is a first pixel configured to receive light that has passed a first pupil area in the image pickup optical system, and constitutes a first detector. The subpixel 201b is a second pixel configured to receive light that has passed a second pupil area different from the first pupil area in the image pickup optical system, and constitutes a second detector. Thus, the image sensor according to this embodiment has pixels that photoelectrically convert light fluxes that have transmitted through different pupil areas in the optical system and can output a pair of signals. Each detector in each pixel serves as the image pickup subpixel and focus detecting subpixel.

FIG. 2B is an enlarged view of the pixel 210G in the image sensor illustrated in FIG. 2A. Coordinate axes xyz are set in such a way that the x-y plane is located on the paper plane illustrated in FIG. 2B, and the z-axis is an axis perpendicular to the paper plane. The subpixels 201a and 201b are arranged in the direction parallel to the x-axis.

FIG. 2C is a sectional view when the pixel 210G is cut along a-a line illustrated in FIG. 2B. In the xyz coordinate axes, the x-z plane is located on the paper plane illustrated in FIG. 2C, and the y-axis is set to an axis perpendicular to the paper plane. The detector includes a photodiode having a p-type layer 200 and an n-type layer, and a micro lens 202 spaced by a predetermined distance in the z-axis direction (optical axis direction). The micro lens 202 is formed on a wiring layer 203.

This embodiment provides the pupils dividing subpixel to all pixels, and each subpixel is used as the focus detecting pixel. The pupil dividing detector used as the focus detecting pixel may be provided to part of the image pickup sensor plane rather than the entire image pickup sensor plane.

Next follows a description of the pupil division in the image sensor 107.

Figure 3:
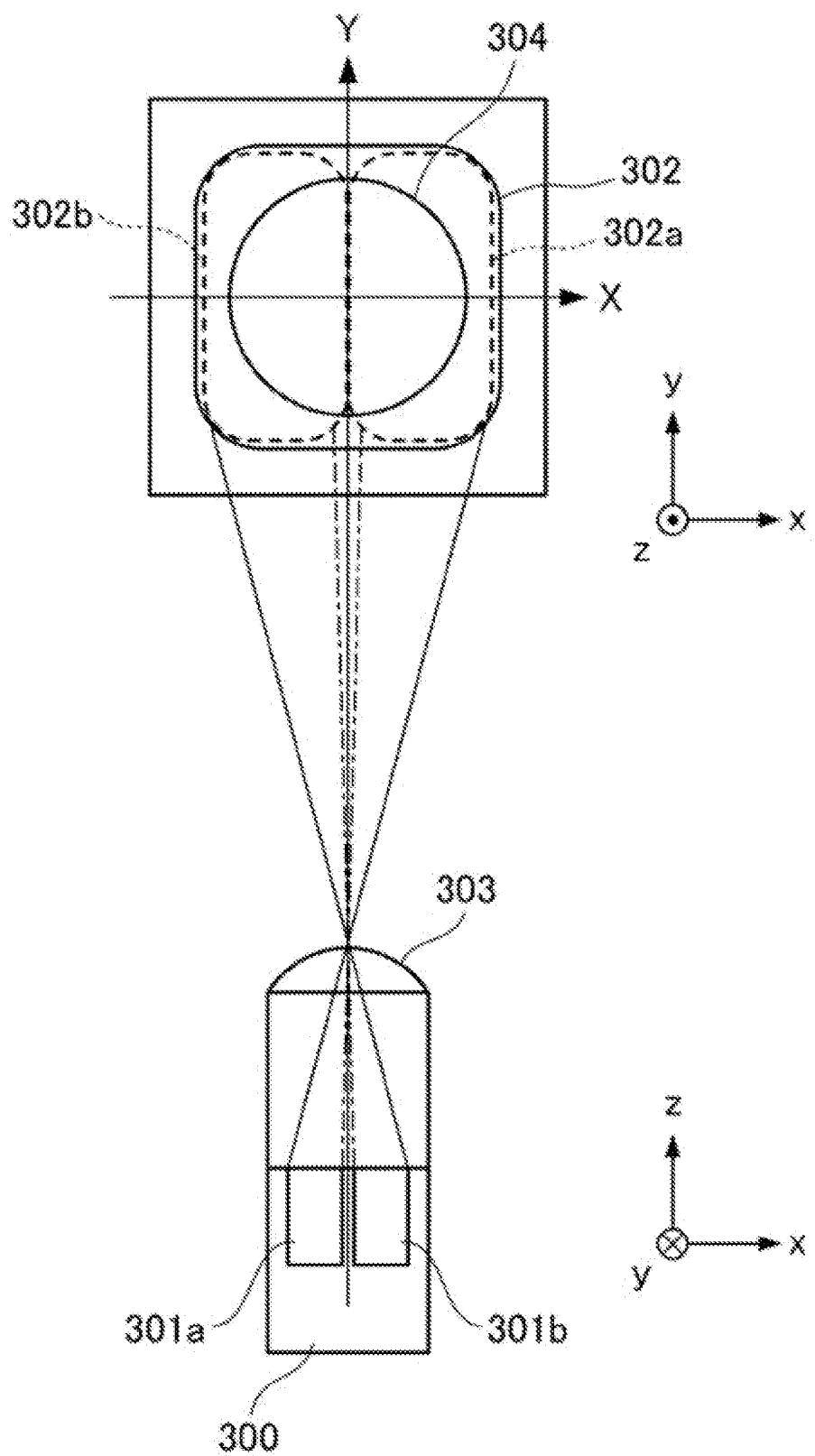
FIG. 3 is a schematic view for explaining a pupil division.

FIG. 3 illustrates the pupil division in one pupil. The xyz coordinate axes is set next to the detector illustrated at the bottom such that the x-y plane is located in the paper plane illustrated in FIG. 3, and the y-axis is an axis perpendicular to the paper plane. The detector includes a p-type layer 300, and n-type layers 301a and 301b. The p-type layer 300 and the n-type layer 301a constitutes the detector corresponding to the subpixel 201a, and the p-type layer 300 and the n-type layer 301b constitutes the detector corresponding to the subpixel 201b. A micro lens 303 is arranged on the z-axis.

An exit pupil 302 and a frame 304, such as a diaphragm frame and a lens frame, are arranged at the top in FIG. 3. The xyz coordinate axes next to it is set such that the x-y plane is located in the paper plane in FIG. 3, and the z-axis is an axis perpendicular to the paper plane.

Since one pixel includes the n-type layers 301a and 301b contained in the p-type layer 300, two subpixels are regularly arranged in the x direction. These two subpixels are biased in the +x direction and −x direction respectively, and thus the pupil division can be achieved with one micro lens 303. An exit pupil 302 includes a pupil 302a for an image signal A and a pupil 302b for an image signal B. The signal A is a first image signal obtained with a subpixel corresponding to the n-type layer 301a that biases in the −x direction. The signal B is a second image signal obtained with a subpixel corresponding to the n-type layer 301b that biases in the +x direction. The focusing state of the image pickup lens can be detected by detecting a relative image shift amount between the image signals A and B and by calculating a defocus amount using a correlation operation between them. Based on the detected result, the defocus amount of the image pickup lens is adjusted. Thus, the signal output from the image sensor 107 includes two signals used for the focus detection. As described later, the corrector corrects the two signals using the first shading correction value when the half-mirror 117 is retreated from the optical path, and using the second shading correction value when the half-mirror 117 is inserted into the optical path. A difference between the two signals at corresponding positions when the half-mirror 117 is inserted into the optical path becomes lower where the two signals are corrected with the second shading correction value than that where the two signals are corrected with the first shading correction value.

The example illustrated in FIG. 3 corresponds to a structure of the object having a brightness distribution in the x direction. A similar structure is applicable to the y direction, and thus this embodiment can be applied to the object having the brightness distribution in the y direction. This embodiment performs the pupil division, and a plurality of subpixels that are biased in one pixel are arranged in one direction. The pupil dividing method is not limited to this embodiment, and a plurality of pupil dividing subpixels may be arranged in two-dimensional directions in the x and y directions. This embodiment arranges a plurality of subpixels for one pupil dividing micro lens, but the pupil dividing method is not limited to this embodiment. One biased pixel may be arranged per one micro lens and a plurality of pixels having different biasing amounts may be used for the focus detection. The following description premises that the subpixels are arranged in the x direction for the pupil division in the x direction, unless otherwise specified.

Figure 4A:
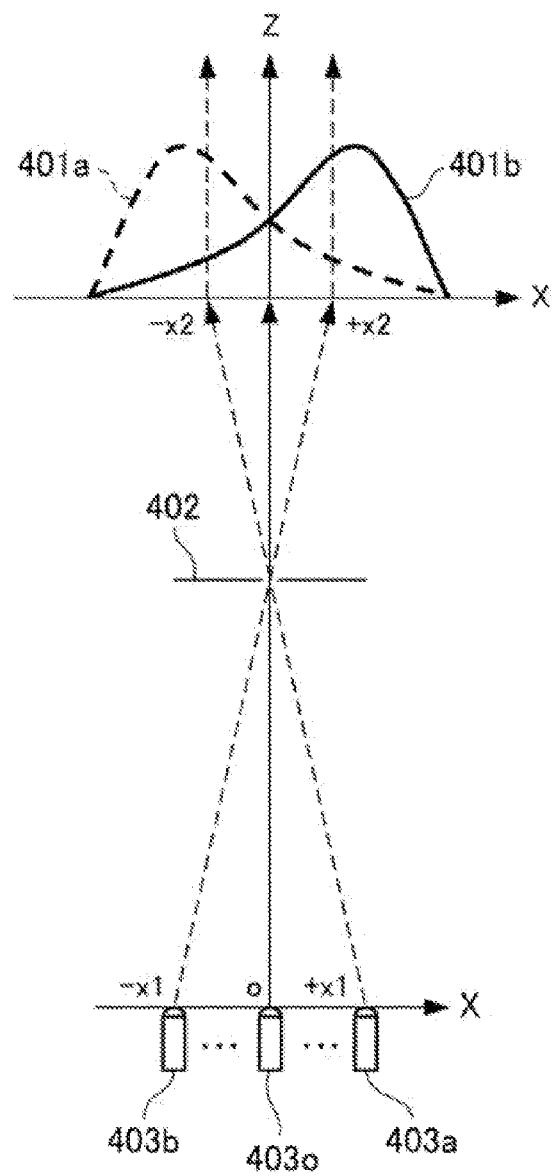
FIG. 4A is a view for explaining of a principle of shading generation.
Figure 4B:
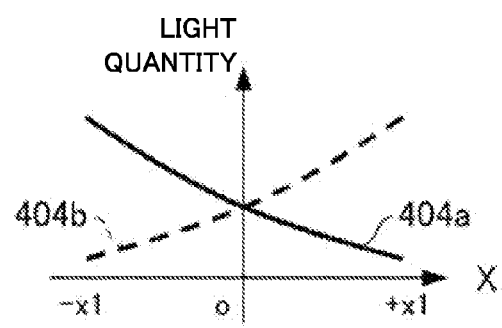
FIG. 4B is a view illustrating shading.

Referring now to FIGS. 4A and 4B, the shading generation principal and generated shading will be described. Initially, a description will be given when the half-mirror 117 is set to the retreat state for simplicity purposes. In FIGS. 4A and 4B, reference numerals 401a denotes a pupil intensity distribution of the image signal A, reference numeral 401b denotes a pupil intensity distribution of the image signal B. Reference numeral 402 denotes a diaphragm frame, reference numerals 403a, 403o and 403b denote pixels of respective image heights. Reference numeral 404a denotes shading of the image signal A in the state of FIG. 4A. Reference numeral 404b denotes shading of the image signal B in the state of FIG. 4A.

In FIG. 4A, a pixel 403b located at the image height of −x1 sees the pupil at the +x2 on the pupil coordinate through the diaphragm frame 402. It is understood from the pupil intensity distributions 401a and 401b in FIG. 4A that the sensitivity of the image signal B is better than the sensitivity of the image signal A. On the other hand, a pixel 403a located at the image height of +x1 sees the pupil at −x2 in the pupil coordinate through the diaphragm frame 402, and thus the sensitivity of the image signal A is better than the sensitivity of the image signal B.

For the above reason, the shading in the state illustrated in FIG. 4A is illustrated in FIG. 4B. Since it is understood from FIG. 4A that the shading changes according to the position and size of the diaphragm frame 402, the shading changes as at least one of the image height, the exit pupil distance, and the diaphragm value changes.

It is understood from FIG. 4B that the shading is a value that continuously changes according to the image height and thus can be expressed by a function having a parameter of the image height. In other words, a shading correction value can be expressed by an expression using a function of the image height. As described above, the shading changes according to the F-number (aperture value), the exit pupil distance, and the image height. The correction value calculator according to this embodiment previously calculates a shading correction value for each condition (combination information on the image height, the exit pupil distance, and the F-number), and calculates an approximate function (see Expressions (1) and (2)). Once the predetermined storage unit (memory) stores coefficients of the approximate function, an operation amount can be reduced.

$$SA(x) = S0A + S1A \cdot x + S2A \cdot x^2 + S3A \cdot y^2 + S4A \cdot x^3 + S5A \cdot x \cdot y^2 \quad (1)$$

$$SB(x) = S0B + S1B \cdot x + S2B \cdot x^2 + S3B \cdot y^2 + S4B \cdot x^3 + S5B \cdot x \cdot y^2 \quad (2)$$

In Expression (1), S0A, S1A, S2A, S3A, S4A, and S5A are the coefficients of the approximate function for calculating the shading correction value SA(x) for the A image. In Expression (2), S0B, S1B, S2B, S3B, S4B, and S5B are the coefficients of the approximate function for calculating the shading correction value SB(x) for the B image. A correction value calculating coefficient is a general term for the coefficient for the A and B images. In this embodiment, in the structure of the image sensor, SA(x) and SB(x) are approximately symmetrical with respect to the origin and thus are expressed by even functions in the y direction (direction orthogonal to the x-axis). Therefore, there is no term of the odd order of y.

As described above, the correction value calculating coefficient is determined based on the image height, the exit pupil distance, and the F-number in the retreat state of the half-mirror 117. The first shading correction value can be thus calculated by the image height, the exit pupil distance, and the F-number.

A description will now be given of a determination method of the correction value calculating coefficient in the insertion state of the half-mirror 117. Referring to FIGS. 5A to 7D, a description will now be given of the influence on the shading by the insertion of the half-mirror 117 into the optical path. FIGS. 5A to 7D are schematic views, and a size relationship can be ignored for convenience.

FIGS. 5A to 5G are schematic view illustrating a shift between the pupil and frame corresponding to the peripheral pixel due to the insertion of the half-mirror 117. FIG. 5A is a sectional view of the y-z plane illustrating an optical path in the insertion state of the half-mirror 117. FIG. 5A illustrates three frame planes of image pickup lens having different exit pupil distance, such as $S_{F1}$, $S_{F2}$, and $S_{F3}$ in order of a smaller exit pupil distance. The frame plane $S_{F2}$ accords with the pupil plane $S_p$. The pupil of the A image and the pupil of the B image are arranged in the paper depth direction (x direction) and a pupil center $C_{PA}$ of the A image and a pupil center $C_{PB}$ of the B image in the pupil plane $S_p$, which will be described later, overlap each other in FIG. 5A, and thus are expressed as one pupil center C. Each of frame centers $C_{F1}$, $C_{F2}$, and $C_{F3}$ is a center of gravity, as described later. A ray in a direction from the peripheral pixel 501 and the frame center $C_{F1}$ is refracted by the half-mirror 117, and thus the frame center $C_{F1}$ shifts by the frame shift amount $d_{F1}$ in the y direction and the ray $L_{F1}$ becomes $L'_{F1}$. $C'_{F1}$ is a frame center shifted by the half-mirror 117. Similarly, frame centers $C_{F2}$ and $C_{F3}$ and a frame center $C_P$ corresponding to rays $L_{F2}$, $L_{F3}$ and $L_P$ shift to frame centers $C'_{F2}$ and $C'_{F3}$ and a frame center $C'_P$, and rays become $L'_{F2}$, $L'_{F3}$ and $L'_P$. These shift amounts are frame shift amounts $d_{F2}$, $d_{F3}$ and a pupil shift amount $d_P$. Herein, the pupil center $C_P$ accords with the frame center $C_{F2}$ and thus the pupil shift amount $d_P$ accords with the frame shift amount $d_{F2}$, and the pupil center $C'_P$ accords with the frame center $C'_{F2}$. When it is assumed that $\theta_{F1}$, $\theta_{F2}$, $\theta_{F3}$, and $\theta_P$ are incident angles of the rays $L'_{F1}$, $L'_{F2}$, $L'_{F3}$, and $L'_P$ upon the half-mirror 117, $\theta_{F1} < \theta_{F2} = \theta_P < \theta_{F3}$ is established. As the incident angle becomes higher, a difference between the incident angle and the refractive angle becomes larger and $d_{F1} < d_{F2} = d_P < d_{F3}$ is established.

FIGS. 5B to 5G are views illustrating positional relationships between the frames and pupils for the frame planes $S_{F1}$, $S_{F2}$ and $S_{F3}$. FIGS. 5B to 5D are general views of the pupil and frame, and FIGS. 5E to 5G are enlarged views of the pupil of the A image in the frame when the half-mirror 117 is inserted. In FIGS. 5B to 5D, reference numeral $512_{PA}$ is the pupil of the A image (pupil center $C_{PA}$) and reference numeral $512_{PB}$ is the pupil of the B image (pupil center $C_{PB}$) in the retreat state of the half-mirror 117. Reference numeral $512'_{PA}$ is the pupil of the A image (pupil center $C'_{PA}$) and reference numeral $512'_{PB}$ is the pupil of the B image (pupil center $C'_{PB}$) in the insertion state of the half-mirror 117. Reference numerals $522_{F1}$, $522_{F2}$, and $522_{F3}$ (frame centers $C_{F1}$, $C_{F2}$, and $C_{F3}$) are frames for the frame planes $S_{F1}$, $S_{F2}$, and $S_{F3}$, in the retreat state of the half-mirror 117. Reference numerals $522'_{F1}$, $522'_{F2}$, and $522'_{F3}$ (frame centers $C'_{F1}$, $C'_{F2}$, and $C'_{F3}$) are frames in the frame planes $S_{F1}$, $S_{F2}$, and $S_{F3}$, in the retreat state of the half-mirror 117. In $S_{F1}$, $522'_{F1}$ shifts by $d_{F1}$ as illustrated in FIG. 5D, and the shading becomes as illustrated in FIG. 5G. In $S_{F2}$, the shading becomes as illustrated in FIG. 5F. In $S_{F3}$, the shading becomes as illustrated in FIG. 5E. It is thus understood that the shading is different in these three views in which the exit pupil distances are different from one another.

As discussed, when the half-mirror 117 is inserted, the shading changes and the changing amount is different according to the exit pupil distance. The changing amount increases as the image height becomes higher.

Figure 6A:
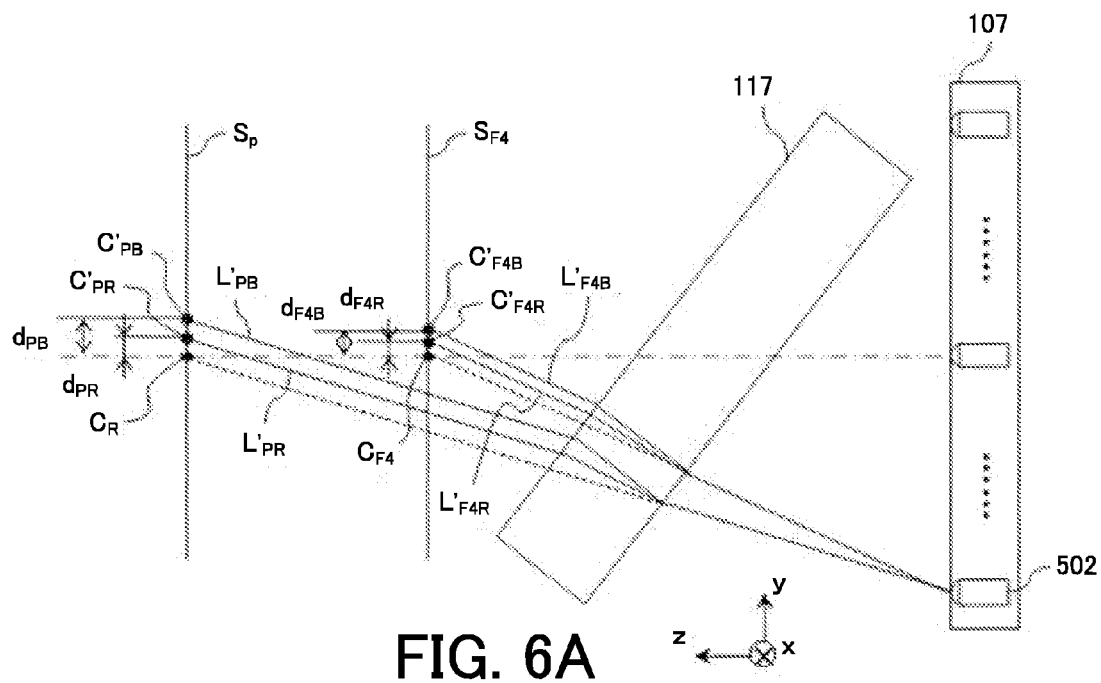
FIGS. 6A to 6E are schematic views illustrating a shift between the pupil and frame corresponding to the peripheral pixel due to the insertion of the half-mirror with different wavelengths of rays. More specifically.

Referring now to FIGS. 6A to 6E, a description will be given of a reason for a shading variation according to the wavelength of light. FIGS. 6A to 6E are schematic views illustrating a shift between the pupil and frame corresponding to the peripheral pixel due to the insertion of the half-mirror 117 for a different wavelength of light. FIG. 6A is a sectional view of the y-z plane illustrating an optical path in the insertion state of the half-mirror 117. A description will be given of an example in which a frame plane $S_{F4}$ is closer to the image sensor 107 than the pupil plane $S_P$. $C_P$ is a pupil center and $C_{F4}$ is a frame center when the half-mirror 117 is retreated. Rays $L'_{PR}$ and $L'_{PB}$ are rays of red and blue wavelengths, and pass pupil centers $C'_{PR}$ and $C'_{PB}$ and the peripheral pixel 502 in the insertion state of the half-mirror. Rays $L'_{F4R}$ and $L'_{F4B}$ are red and blue rays having the same wavelengths as those of $L'_{PR}$ and $L'_{PB}$, and pass pupil centers $C'_{F4R}$ and $C'_{F4B}$ on the frame plane $S_{F4}$ and the peripheral pixel 502 in the insertion state of the half-mirror. A refractive index of an optical element, such as a half-mirror, changes according to a wavelength. A pupil shift amount $d_{PR}$ of the pupil center $C'_{PR}$, a pupil shift amount $d_{PB}$ of the pupil center $C'_{PB}$, a pupil shift amount $d_{F4R}$ of the pupil center $C'_{F4R}$, and a pupil shift amount $d_{F4B}$ of the pupil center $C'_{F4B}$ satisfy $d_{PR} < d_{PB}$, $d_{F4R} < d_{F4B}$. When a shift amount difference of $d_{PB} - d_{PR}$ caused by the wavelength difference is compared with that of $d_{F4B} - d_{F4R}$, $d_{PB} - d_{PR} > d_{F4B} - d_{F4R}$ is established. Therefore, a shift amount difference $\Delta d_{F4B} = d_{PB} - d_{F4B}$ between the pupil and the frame for the blue ray and a shift amount difference $\Delta d_{F4R} = d_{PR} - d_{F4R}$ between the pupil and the frame for the red ray satisfy $\Delta d_{F4B} > \Delta d_{F4R}$.

Figure 6B:
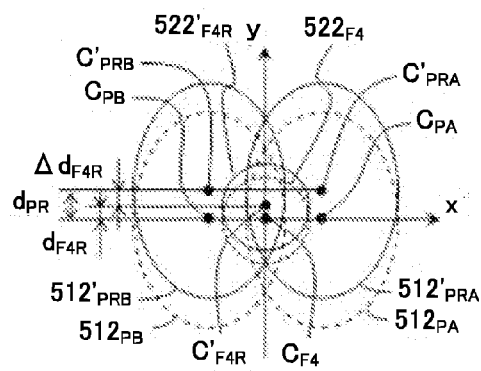
Figure 6C:
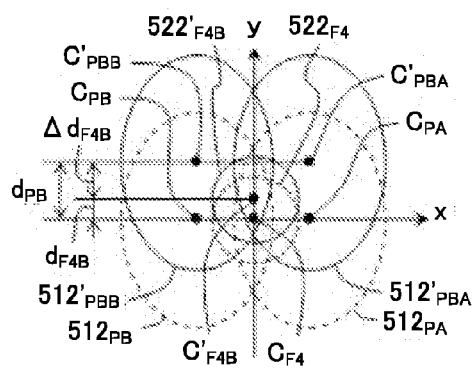
Figure 6D:
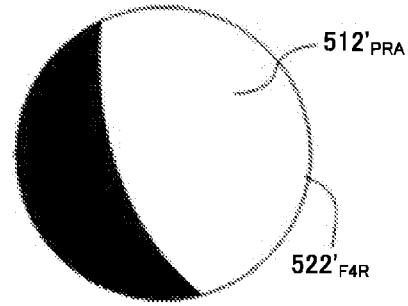
Figure 6E:
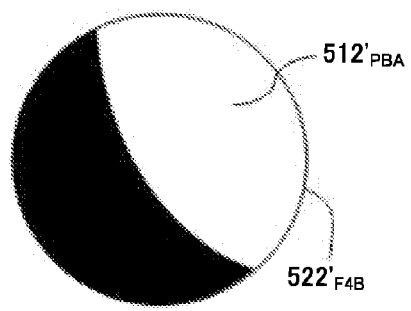

FIGS. 6B to 6E are views illustrating positional relationships between the frames and pupils when the red and blue rays are incident. FIGS. 6B and 6C are general views of the pupil and frame, and FIGS. 6D and 6E are enlarged views of the pupil of the A image in the frame when the half-mirror 117 is inserted. In FIG. 6B, for the red ray, reference numeral $512'_{PRA}$ is the pupil of the A image (pupil center $C'_{PRA}$), reference numeral $512'_{PRB}$ is the pupil of the B image (pupil center $C'_{PRB}$), and reference numeral $522'_{F4R}$ is a frame (frame center $C'_{F4R}$) in the insertion state of the half-mirror 117. In the frame plane $S_{F4}$, reference numeral $522_{F4}$ is a frame (frame center $C_{F4}$). Similarly, in FIG. 6C, for the blue ray, reference numeral $512'_{PBA}$ is the pupil of the A image (pupil center $C'_{PBA}$), reference numeral $512'_{PBB}$ is the pupil of the B image (pupil center $C'_{PBB}$), and reference numeral $522'_{F4B}$ is a frame (frame center $C'_{F4B}$) in the insertion state of the half-mirror 117. As described above, the shift amount difference between the pupil and the frame for the blue light and that for the red light satisfy $\Delta d_{F4B} > \Delta d_{F4R}$. Therefore, the shading for the red wavelength illustrated in FIG. 6D and the shading for the blue wavelength illustrated in FIG. 6E are different from each other. Thus, a shading changing amount caused by the insertion of the half-mirror 117 is different according to the wavelength difference even with the same exit pupil distance and the same image height.

It is consequently necessary for the image pickup apparatus according to this embodiment to calculate the correction value calculating coefficient according to the spectral sensitivity characteristic of each pixel.

As described above, the shading changes according to the image height, the exit pupil distance, the F-number, and the spectral sensitivity characteristic of the focus detecting pixel. Therefore, the correction value calculating coefficient in the insertion state of the half-mirror 117 is determined based on the image height, the exit pupil distance, the F-number, and the spectral sensitivity characteristic of the focus detecting pixel. The second shading correction value can be calculated based on the image height, the exit pupil distance, the F-number, and the spectral sensitivity characteristic of the focus detecting pixel.

According to this embodiment, the correction value calculating coefficient is different according to whether the half-mirror is inserted or retreated. The shading correction value, such as the first shading correction value and the second shading correction value, is different according to the state of the half-mirror. The CPU 121 that serves as the shading corrector according to this embodiment corrects the signal using the first shading correction value when the half-mirror is retreated from the optical path, and using the second shading correction value different from the first shading correction value when the half-mirror is inserted into the optical path.

Figure 7A:
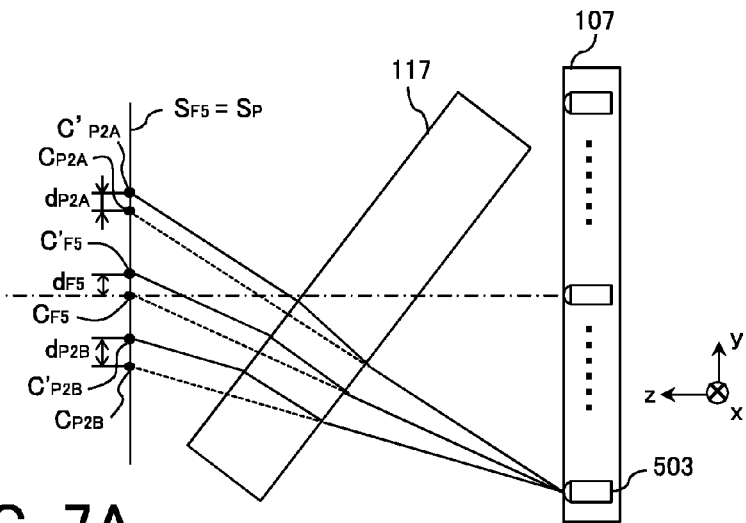
FIGS. 7A to 7D are schematic views illustrating a shift between the pupil and frame corresponding to the peripheral pixel due to the insertion of the half-mirror when the pupil is divided in the y axis direction. More specifically.

The pupil division in the x direction has hitherto been described. Referring now to FIG. 7, a description will be given of a shift between the frame and pupil due to the insertion of the half-mirror 117 for the pupil division in the y direction. FIG. 7 is a schematic view illustrating a shift between the pupil and the frame corresponding to the peripheral pixel 503 due to the insertion of the half-mirror 117 for the pupil division in the y direction. FIG. 7A is a schematic view of the y-z plane illustrating the optical path in the insertion state of the half-mirror 117. A description will be given of an example in which a frame plane $S_{F5}$ accords with the pupil plane $S_P$. A pupil center $C_{P2A}$ of the A image, a pupil center $C_{P2B}$, of the B image, and a frame center $C_{F5}$ in the retreat state of the half-mirror 117 shift to pupil centers $C'_{P2A}$ and $C'_{P2B}$ and a frame center $C_{F5}$ as a result of that the half-mirror 117 is inserted. For the pupil division in the y direction, the pupil positions in the y direction of the A and B images are different and thus rays emitted from the pupil centers $C_{P2A}$ and $C_{P2B}$ and the frame center $C_{F5}$ enter the half-mirror 117 at different incident angles. Therefore, a pupil shift amount $d_{P2A}$ for the A image, a pupil shift amount $d_{P2B}$ for the B image, and $d_{F5}$ are different from one another.

Figure 7B:
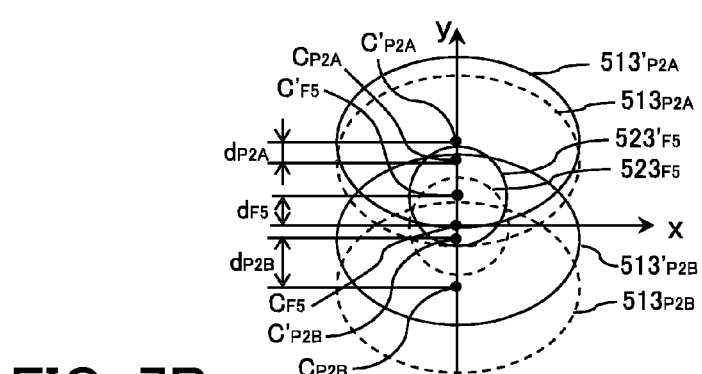
Figure 7C:
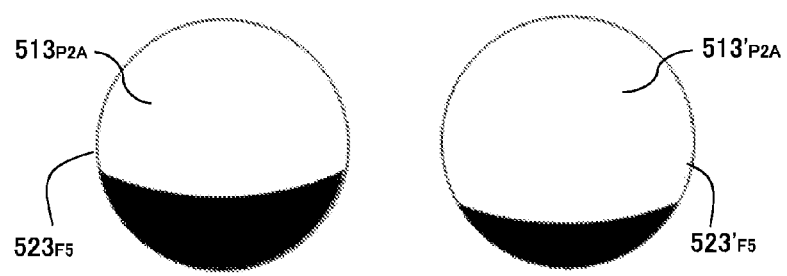
Figure 7D:
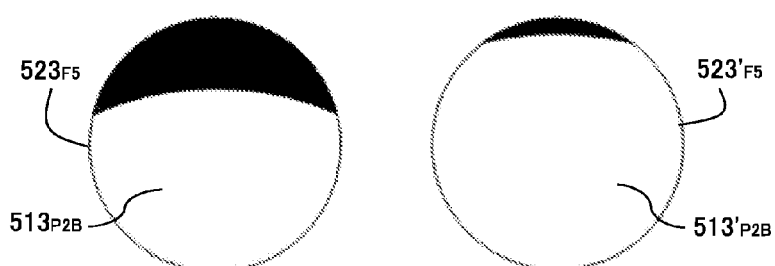

FIGS. 7B to 7D are general views of the pupil and frame. FIG. 7B is a general view of the pupil and frame, FIG. 7C is an enlarged view of the pupil of the A image in the frame, and FIG. 7D is an enlarged view of the pupil of the B image in the frame. In FIGS. 7C and 7D, the left view illustrates the pupil in the retreat state of the half-mirror 117, and the right view illustrates the pupil in the insertion state of the half-mirror 117. In FIG. 7B, the pupil $513_{P2A}$ of the A image (pupil center $C_{P2A}$), the pupil $513_{P2B}$ of the B image (pupil center $C_{P2B}$), and the frame $523_{F5}$ (frame center $C_{F5}$) shift in the y direction due to the insertion of the half-mirror 117. In other words, as illustrated in FIG. 7B, they shift to $513'_{P2A}$ (pupil center $C'_{P2A}$), $513'_{P2B}$ (pupil center $C'_{P2B}$), and $523'_{F5}$ (frame center $C'_{F5}$). It is understood from FIGS. 7C and 7D that shading of each of the A and B images changes due to the insertion of the half-mirror 117. Since a moving amount of the pupil for the A image and a moving amount of the pupil for the B image are different from each other, a shading changing amount is also different.

Thus, this embodiment can highly precisely correct shading even when the half-mirror 117 is inserted into the optical path by calculating a correction value based on the image height, the exit pupil distance, the F-number, and the spectral sensitivity characteristic of the focus detecting pixel. Thereby, even when the half-mirror is inserted into a space between the image pickup lens and the image sensor, this embodiment can achieve a precise shading correction and in turn a precise focus detection. This embodiment can provide an image pickup apparatus advantageous to the focus detection.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions. For example, this embodiment uses Expressions (1) and (2) to calculate the shading correction values. Nevertheless, the present invention is not limited to this embodiment, and the image pickup apparatus may store the correction values that depend on the image height, the exit pupil distance, the F-number, etc., and may determine the shading correction value without any calculations.

The present invention is applicable to an image pickup apparatus, such as a compact digital camera, a single-lens reflex camera, and a video camera.

This application claims the benefit of Japanese Patent Application No. 2014-079833, filed Apr. 9, 2014, which is hereby incorporated by reference herein in its entirety.

What is claimed is:

1. A focus detecting unit comprising:
   a corrector configured to correct, so that a difference between parallax images decreases, parallax image signals output from an image sensor using a first shading correction value or a second shading correction value which is different from the first shading correction value and relies on more parameters than the first shading correction value, wherein the corrector corrects the parallax image signals using the first shading correction value when a half-mirror is retreated from an optical path, and the corrector corrects the signals using the second shading correction value when the half-mirror is inserted into the optical path; and
   a focus detector configured to provide a focus detection based on the parallax image signals corrected by the corrector.

2. The focus detecting unit according to claim 1, wherein the parallax image signals output from the image sensor are two signals used for the focus detection,
   wherein the corrector corrects the two signals using the first shading correction value when the half-mirror is retreated from the optical path, and using the second shading correction value when the half-mirror is inserted into the optical path, and
   wherein a difference between the two signals at corresponding positions when the half-mirror is inserted into the optical path becomes lower where the two signals are corrected with the second shading correction value than that where the two signals are corrected with the first shading correction value.

3. The focus detecting unit according to claim 1, wherein the second shading correction value is based on a spectral sensitivity characteristic of a pixel in the image sensor.

4. The focus detecting unit according to claim 1, wherein the first shading correction value is based on an image height, an exit pupil distance, and an F-number, and the second shading correction value is based on the image height, the exit pupil distance, the F-number, and a spectral sensitivity characteristic of a pixel in the image sensor.

5. The focus detecting unit according to claim 4, wherein the corrector calculates the first shading correction value based on a first approximate function determined by the image height, the exit pupil distance, and the F-number, and the second shading correction value based on a second approximate function determined by the image height, the exit pupil distance, the F-number, and the spectral sensitivity characteristic of the pixel in the image sensor.

6. The image pickup apparatus according to claim 5, further comprising a storage unit configured to store first coefficients for the first approximate function and second coefficients for the second approximate function.

7. The focus detecting unit according to claim 1, wherein the second shading correction value has higher wavelength dependency than the first shading correction value.

8. An image pickup apparatus comprising:
   a half-mirror that can be inserted into and retreated from an optical path;
   an image sensor;
   a corrector configured to correct, so that a difference between parallax images decreases, parallax image signals output from the image sensor using a first shading correction value or a second shading correction value which is different from the first shading correction value and relies on more parameters than the first shading correction value, wherein the corrector corrects the parallax image signals using the first shading correction value when the half-mirror is retreated from the optical path, and the corrector corrects the signals using the second shading correction value when the half-mirror is inserted into the optical path; and
   a focus detector configured to provide a focus detection based on the parallax image signals corrected by the corrector.

9. The image pickup apparatus according to claim 8, wherein the image sensor includes pixels configured to output a pair of signals by photoelectrically converting light fluxes that have passed different pupil areas in an optical system.

10. An image pickup system comprising an image pickup apparatus, and an image pickup lens attachable to and detachable from the image pickup apparatus, wherein the image pickup apparatus includes:
    a half-mirror that can be inserted into and retreated from an optical path;
    an image sensor;
    a corrector configured to correct, so that a difference between parallax images decreases, parallax image signals output from the image sensor using a first shading correction value or a second shading correction value which is different from the first shading correction value and relies on more parameters than the first shading correction value, wherein the corrector corrects the parallax image signals using the first shading correction value when the half-mirror is retreated from the optical path, and the corrector corrects the signals using the second shading correction value when the half-mirror is inserted into the optical path; and
    a focus detector configured to provide a focus detection based on the parallax image signals corrected by the corrector.

11. A focus detecting method comprising:
    a correcting step of correcting, so that a difference between parallax images decreases, parallax image signals a output from an image sensor using a first shading correction value or a second shading correction value which is different from the first shading correction value and relies on more parameters than the first shading correction value, wherein the parallax image signals are corrected using the first shading correction value when a half-mirror is retreated from an optical path, and the signals are corrected using the second shading correction value when the half-mirror is inserted into the optical path; and
    a focus detection step of providing a focus detection based on the parallax image signals that has been corrected by the correcting step.

12. A non-transitory computer readable storage medium configured to store a program that enables a computer to execute a focus detecting method that includes:

a correcting step of correcting, so that a difference between parallax images decreases, parallax images signals output from an image sensor using a first shading correction value or a second shading correction value in which different from the first shading correction value and relies on more parameters than the first shading correction value, wherein the parallax image signals are corrected using the first shading correction value when a half-mirror is retreated from an optical path, and the signals are corrected using the second shading correction value when the half-mirror is inserted into the optical path; and a focus detection step of providing a focus detection based on the parallax image signals that has been corrected by the correcting step.

* * * * *